United States Patent
Deolalikar et al.

(10) Patent No.: US 11,346,201 B2
(45) Date of Patent: May 31, 2022

(54) CLOSED-LOOP SPEED/POSITION CONTROL MECHANISM

(71) Applicant: Halliburton Energy Services, Inc., Houston, TX (US)

(72) Inventors: Neelesh V. Deolalikar, Houston, TX (US); Daniel Winslow, Spring, TX (US)

(73) Assignee: Halliburton Energy Services, Inc., Houston, TX (US)

(*) Notice: Subject to any disclaimer, the term of this patent is extended or adjusted under 35 U.S.C. 154(b) by 524 days.

(21) Appl. No.: 15/112,555

(22) PCT Filed: Feb. 20, 2014

(86) PCT No.: PCT/US2014/017397
§ 371 (c)(1),
(2) Date: Jul. 19, 2016

(87) PCT Pub. No.: WO2015/126399
PCT Pub. Date: Aug. 27, 2015

(65) Prior Publication Data
US 2016/0326857 A1    Nov. 10, 2016

(51) Int. Cl.
*E21B 44/02*    (2006.01)
*E21B 4/00*    (2006.01)
(Continued)

(52) U.S. Cl.
CPC .............. *E21B 44/02* (2013.01); *E21B 4/006* (2013.01); *E21B 4/04* (2013.01); *E21B 7/068* (2013.01);
(Continued)

(58) Field of Classification Search
CPC . E21B 44/02; E21B 4/006; E21B 4/04; E21B 7/068; E21B 21/10; E21B 34/063; G01P 3/00; G01V 11/005
See application file for complete search history.

(56) References Cited

U.S. PATENT DOCUMENTS 5,265,682 A * 11/1993 Russell ..................... E21B 4/02
175/45
5,617,926 A * 4/1997 Eddison .................. E21B 7/067
175/61

(Continued)

FOREIGN PATENT DOCUMENTS

EP         1477705 B1    10/2010
WO      2008/076625 A2    6/2008

OTHER PUBLICATIONS

International Search Report and Written Opinion issued in related PCT Application No. PCT/US2014/017397 dated Nov. 20, 2014, 17 pages.

(Continued)

*Primary Examiner* — Christopher J Sebesta
*Assistant Examiner* — Neel Girish Patel
(74) *Attorney, Agent, or Firm* — Benjamin Ford; Baker Botts L.L.P.

(57) ABSTRACT

According to aspects of the present disclosure, systems and methods for a closed-loop speed/position control mechanism. An example system may include a housing and a planetary gearbox disposed within the housing, wherein a ring gear of the planetary gearbox is coupled to the housing, a sun gear of the planetary gearbox is coupled to a drive shaft, and a planetary carrier of the planetary gearbox is coupled to an output shaft. A controller may receive measurements from sensors proximate to the output shaft and use those measurements to transmit control signals to change the rotation of the drive shaft. In this way, the output (Continued)

shaft may be rotated independently of the housing by controlling the rotation of the drive shaft. In example systems, the output shaft may be a sonde or an offset mandrel coupled to a drill bit. The rive shaft may be coupled to a fluid-controlled controlled drive mechanism and rotation may be controlled by adjusting flow control valve. The closed-loop system may be used to set a target rotation speed of said output shaft or may be used to maintain the output shaft in a constant position or orientation despite housing rotation.

20 Claims, 6 Drawing Sheets (51) Int. Cl.
    *E21B 4/04*     (2006.01)
    *E21B 7/06*     (2006.01)
    *E21B 21/10*     (2006.01)
    *E21B 34/06*     (2006.01)
    *G01P 3/00*     (2006.01)
    *G01V 11/00*     (2006.01)

(52) U.S. Cl.
    CPC ............ *E21B 21/10* (2013.01); *E21B 34/063* (2013.01); *G01P 3/00* (2013.01); *G01V 11/005* (2013.01)

(56) References Cited

U.S. PATENT DOCUMENTS

| | | | |
|---|---|---|---|
| 6,173,794 B1* | 1/2001 | von Gynz-Rekowski | E21B 4/006 175/107 |
| 6,257,356 B1 | 7/2001 | Wassell | |
| 6,837,315 B2* | 1/2005 | Pisoni | E21B 7/067 175/269 |
| 10,018,030 B2* | 7/2018 | Deolalikar | E21B 7/06 |
| 2002/0066598 A1* | 6/2002 | Rozendaal | E21B 7/06 175/53 |
| 2002/0096362 A1* | 7/2002 | Rankin | E21B 10/26 175/26 |
| 2004/0040751 A1* | 3/2004 | Falvey | E21B 17/046 175/415 |
| 2004/0104051 A1* | 6/2004 | Moriarty | E21B 7/20 175/57 |
| 2004/0262043 A1* | 12/2004 | Schuaf | E21B 47/18 175/57 |
| 2006/0254819 A1* | 11/2006 | Moriarty | E21B 47/18 175/40 |
| 2007/0079988 A1* | 4/2007 | Konschuh | E21B 4/02 175/40 |
| 2008/0135292 A1* | 6/2008 | Sihler | E21B 44/005 175/27 |
| 2008/0142264 A1* | 6/2008 | Hall | E21B 4/006 175/45 |
| 2009/0126997 A1* | 5/2009 | Webb | E21B 7/046 175/55 |
| 2009/0229883 A1* | 9/2009 | Hall | E21B 10/42 175/107 |
| 2009/0308659 A1* | 12/2009 | Crowley | E21B 17/1014 175/61 |
| 2010/0187009 A1* | 7/2010 | Siher | E21B 4/006 175/57 |
| 2010/0212965 A1 | 8/2010 | Hall et al. | |
| 2010/0212966 A1* | 8/2010 | Hall | E21B 10/322 175/106 |
| 2011/0100715 A1* | 5/2011 | Kolle | E21B 21/16 175/71 |
| 2011/0129375 A1* | 6/2011 | Kotsonis | F04C 13/008 418/4 |
| 2014/0130893 A1* | 5/2014 | Harestad | E21B 43/123 137/68.11 |
| 2014/0151122 A1* | 6/2014 | Venugopal | E21B 47/017 175/40 |
| 2015/0368973 A1* | 12/2015 | Gajji | E21B 17/1078 175/61 |
| 2016/0084006 A1* | 3/2016 | Marland | E21B 4/006 175/40 |
| 2016/0290089 A1* | 10/2016 | McMillon | E21B 33/03 |
| 2017/0023068 A1* | 1/2017 | Maw | E21B 4/006 |
| 2017/0335670 A1* | 11/2017 | Dykstra | E21B 47/024 |

OTHER PUBLICATIONS

International Preliminary Report on Patentability issued in related Application No. PCT/US2014/017397, dated Sep. 1, 2016 (11 pages).

* cited by examiner

CLOSED-LOOP SPEED/POSITION CONTROL MECHANISM

CROSS-REFERENCE TO RELATED APPLICATIONS

This application is a U.S. National Stage Application of International Application No. PCT/US2014/017397 filed Feb. 20, 2014, which is incorporated herein by reference in its entirety for all purposes.

BACKGROUND

The present disclosure relates generally to well drilling operations and, more particularly, to a closed-loop speed/position control mechanism.

During well drilling operations, a sonde or other assembly may be coupled to a rotating housing. In such circumstances, it may be desirable to control the rotation of the sonde independently from the rotation of the housing or to maintain the sonde in a geostationary position. This may occur, for example, in rotary steerable systems where a drill bit is coupled to an offset mandrel via a drill shaft, and it may be desirable to control the rotation of the offset mandrel (and thereby the orientation of the drill bit) independently of the rotation of the drill string and drill bit. Responsive control may reduce overall rig time by assuring the borehole is drilled according to the well plan.

FIGURES

Some specific exemplary embodiments of the disclosure may be understood by referring, in part, to the following description and the accompanying drawings.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to well drilling operations and, more particularly, to a closed-loop speed control mechanism.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

The terms "couple" or "couples" as used herein are intended to mean either an indirect or a direct connection. Thus, if a first device couples to a second device, that connection may be through a direct connection, or through an indirect electrical or mechanical connection via other devices and connections. The term "upstream" as used herein means along a flow path towards the source of the flow, and the term "downstream" as used herein means along a flow path away from the source of the flow. The term "uphole" as used herein means along the drill string or the hole from the distal end towards the surface, and "downhole" as used herein means along the drill string or the hole from the surface towards the distal end.

It will be understood that the term "oil well drilling equipment" or "oil well drilling system" is not intended to limit the use of the equipment and processes described with those terms to drilling an oil well. The terms also encompass drilling natural gas wells or hydrocarbon wells in general. Further, such wells can be used for production, monitoring, or injection in relation to the recovery of hydrocarbons or other materials from the subsurface. This could also include geothermal wells intended to provide a source of heat energy instead of hydrocarbons.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory ("RAM"), one or more processing resources such as a central processing unit ("CPU") or hardware or software control logic, ROM, and/or other types of nonvolatile memory. The information handling system may further include a microcontroller, which may be a small computer on a single integrated circuit containing a processor core, memory, and programmable input/output peripherals. Additional components of the information handling system may include one or more disk drives, one or more network ports for communication with external devices as well as various input and output ("I/O") devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory ("EEPROM"), and/or flash memory; as well as communications media such as wires.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, multilateral, u-tube connection, intersection, bypass (drill around a mid-depth stuck fish and back into the well below), or otherwise nonlinear wellbores in any type of subterranean formation. Embodiments may be applicable to injection wells, and production wells, including natural resource production wells such as hydrogen sulfide, hydrocarbons or geothermal wells; as well as borehole construction for river crossing tunneling and other such tunneling boreholes for near-surface construction purposes or borehole u-tube pipelines used for the transportation of fluids such as hydrocarbons. Embodiments described below with respect to one implementation are not intended to be limiting.

Figure 1:
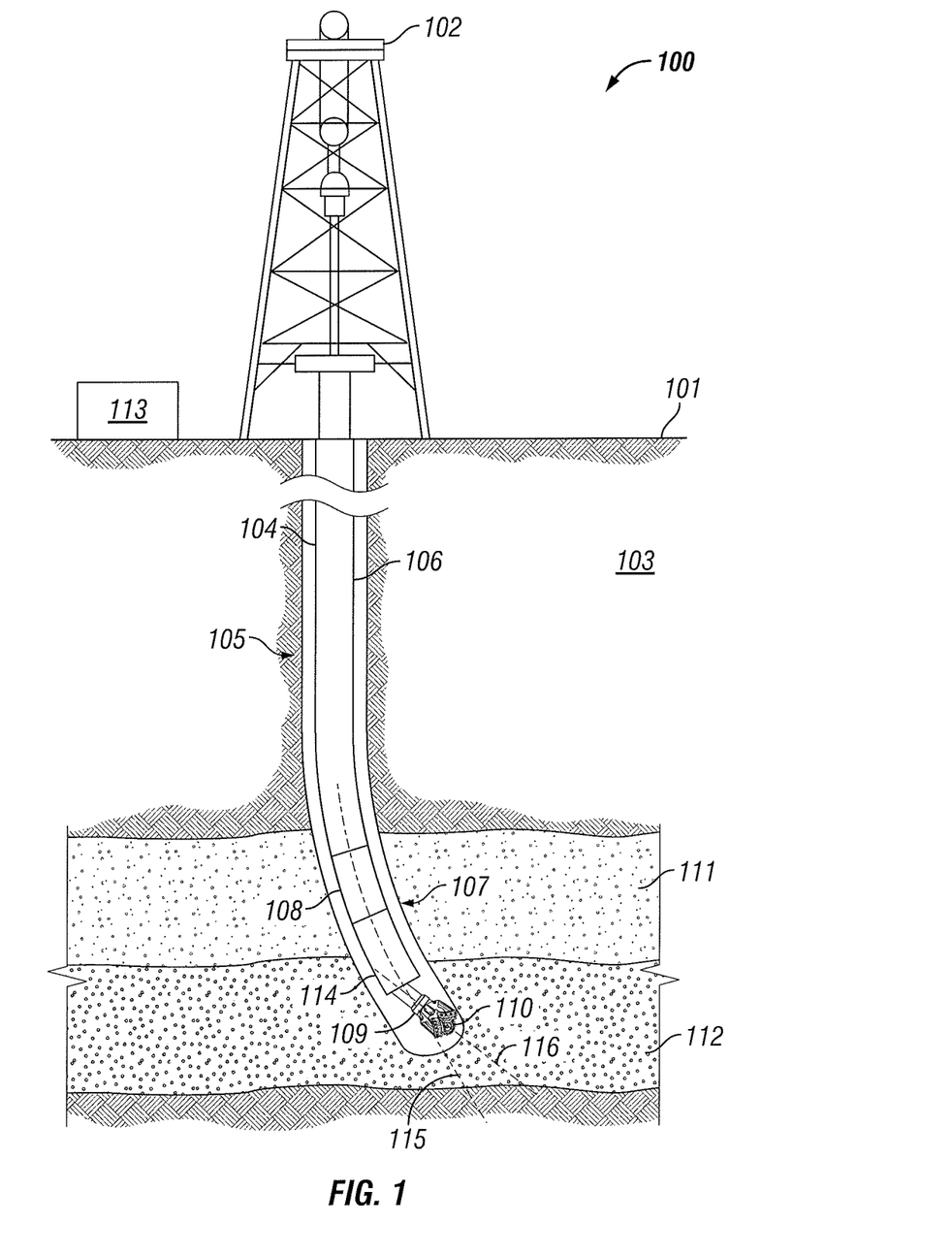
FIG. 1 is a diagram illustrating an example drilling system, according to aspects of the present disclosure.

FIG. 1 is a diagram illustrating an example drilling system 100, according to aspects of the present disclosure. The drilling system 100 includes rig 102 mounted at the surface 101 and positioned above borehole 104 within a subterranean formation 103. In the embodiment shown, a drilling assembly 105 may be positioned within the borehole 104 and may be coupled to the rig 102. The drilling assembly 105 may include drill string 106 and bottom hole assembly (BHA) 107. The drill string 106 may include a plurality of segments threadedly connected. The BHA 107 may include a drill bit 109, a measurement-while-drilling (MWD) apparatus 108 and a steering assembly 114. The steering assembly 114 may control the direction in which the borehole 104 is being drilled. As will be appreciated by one of ordinary skill in the art in view of this disclosure, the borehole 104 will be drilled in the direction perpendicular to the tool face 110 of the drill bit 109, which corresponds to the longitudinal axis 116 of the drill bit 109. Accordingly, controlling the direction of the borehole 104 may include controlling the angle between the longitudinal axis 116 of the drill bit 109 and longitudinal axis 115 of the steering assembly 114, and controlling the angular orientation of the drill bit 109 relative to the formation 103.

According to aspects of the present disclosure that will be described below, the steering assembly 114 may include an offset mandrel (not shown) that causes the longitudinal axis 116 of the drill bit 109 to deviate from the longitudinal axis 115 of the steering assembly 114. The steering assembly 114 may receive control signals from a control unit 113. Though the control unit 113 is shown at the surface in FIG. 1, it may be located at the surface, downhole, or at a remote location. The control unit 113 may include an information handling system and computer-readable media, and it may communicate with the steering assembly 114 via a telemetry system. In certain embodiments, as will be described below, the control unit 113 may transmit control signals to the steering assembly 114 to alter the longitudinal axis 115 of the drill bit 109 as well as to control counter-rotation of portions of the offset mandrel to maintain the angular orientation of the drill bit 109 relative to formation 103. As used herein, maintaining the angular orientation of a drill bit 109 relative to the formation 103 may be referred to as maintaining the drill bit 109 in a "geo-stationary" position. In certain embodiments, an information handling system and computer-readable media may be located within the steering assembly 114 to perform some or all of the control functions. Moreover, other BHA 107 components, including the MWD apparatus 108, may communicate with and receive instructions from control unit 113.

In certain embodiments, the drill string 106 may be rotated to drill the borehole 104. The rotation of the drill string 106 may in turn rotate the BHA 107 and drill bit 109 with the same rotational direction and speed. The rotation may cause the steering assembly 114 to rotate about its longitudinal axis 115, and the drill bit 109 to rotate around its longitudinal axis 116 and the longitudinal axis 115 of the steering assembly 114. The rotation of the drill bit 109 about its longitudinal axis 116 is desired to cause the drill bit 109 to cut into the formation, but the rotation of the drill bit 109 about the longitudinal axis 115 of the steering assembly 114 may be undesired in certain instances, as it changes the angular orientation of the drill bit 109 relative to the formation 103. For example, when the longitudinal axis 116 of the drill bit 109 is at an angle from the longitudinal axis of the drill string 115, as it is in FIG. 1, the drill bit 109 may rotate about the longitudinal axis 115 of the steering assembly 114, preventing the drilling assembly 100 from drilling at a particular angle and direction.

Figure 2:
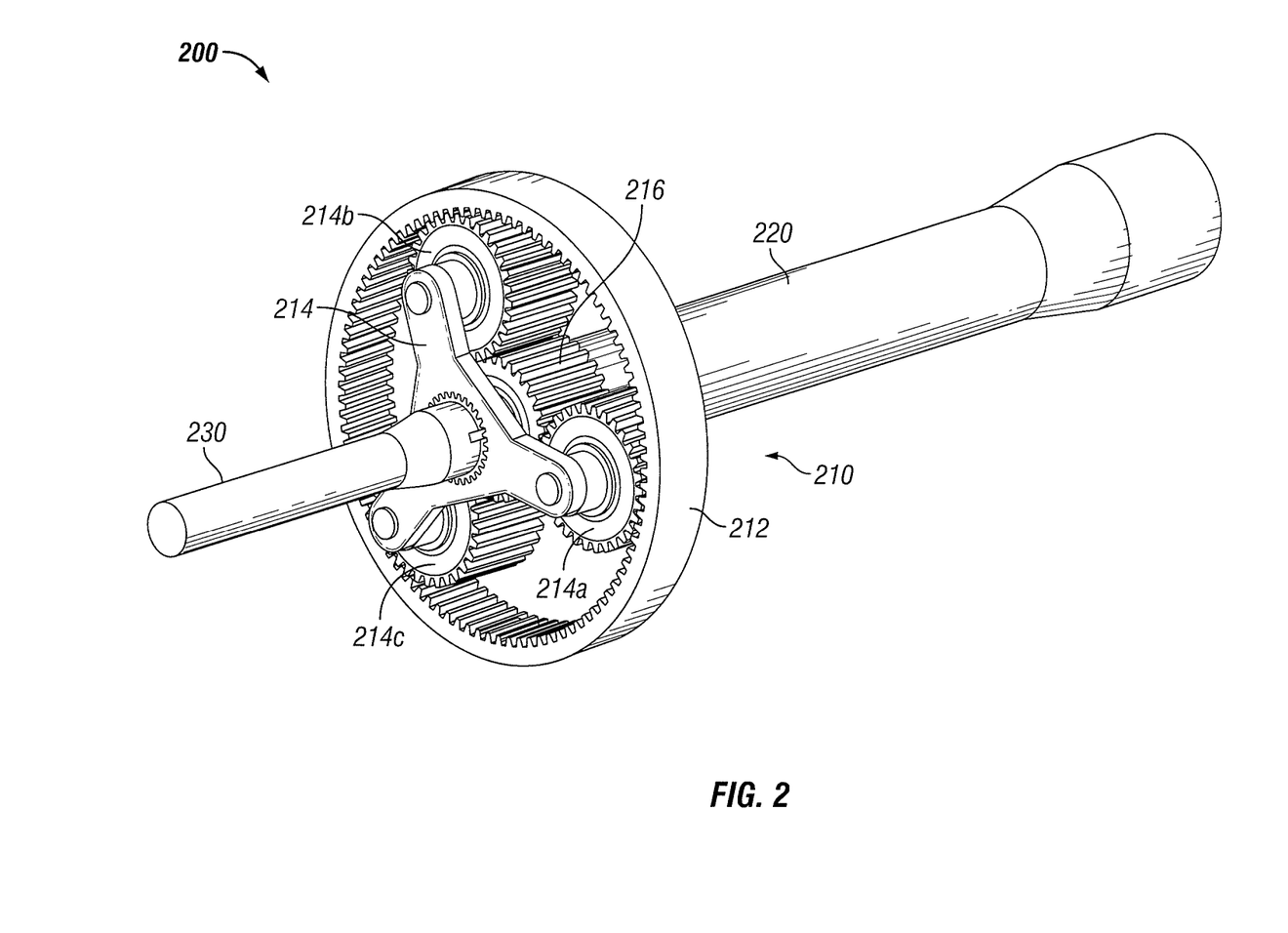
FIG. 2 is a diagram illustrating an example speed/position control mechanism, according to aspects of the present disclosure.

FIG. 2 is a diagram illustrating an example speed/position control mechanism 200, according to aspects of the present disclosure. In the embodiment of FIG. 2, a planetary gearbox 210 is shown with ring gear 212, planet carrier 214, and sun gear 216. In the embodiment of FIG. 2 planet carrier 214 is shown to comprise three planet gears 214a-c, but in alternative embodiments other numbers of planet gears may be used.

In certain embodiments, planetary gearbox 210 may be disposed within a drill string, such as drill string 106. Ring gear 212 may be coupled to drill string 106, such that the rotation of drill string 106, for example during drilling operations, may induce a similar rotation on ring gear 212. A drive shaft may be coupled to sun gear 216; in the embodiment of FIG. 2, the drive shaft is shown to be turbine 220. As will be discussed below, with reference to FIGS. 3A-C, the turbine 220 may be part of an electro-hydromechanical drive system and may drive the rotation of sun gear 216. An output shaft may be coupled to planet carrier 214 such that the rotation of planet carrier 214 around sun gear 216 may cause the output shaft to rotate; in the embodiment of FIG. 2, the output shaft is shown to be sonde 230. In alternative embodiments, other types of assemblies may be coupled to sun gear 216 instead of sonde 230. For example, in the embodiment of FIGS. 3A-C discussed below, an offset mandrel may be coupled to sun gear 216.

Thus, a person of ordinary skill in the art, in light of the present disclosure, will appreciate that the rotation of the sonde 230 may be controlled by the rotational speed of the planet carrier 214, which in turn may be determined by the relative rotational speeds of the sun gear 216 and ring gear 212. For example, if the ring gear 212 is rotating clockwise at a higher rate of rotational speed relative to the counter-clockwise rotation of sun gear 216, planet carrier 214 will rotate in a clockwise direction around sun gear 216, which may cause sonde 230 to rotate in a clockwise direction. As the sun gear 216 increases in counter-clockwise rotational speed relative to the rotational speed of ring gear 212—for example, because of a decrease in rotational speed of the drill string 106 that is coupled to ring gear 212 or because of an increase in rotational speed of sun gear 216 driven by turbine 220—the rotational speed of planet carrier 214 around sun gear 216 will slow until, at a certain rotational speed of sun gear 216, the planet carrier 214 is stationary (although the individual planet gears 214a-c may be rotating). At this point, the sonde 230 may also remain stationary. If the sun gear 216 further increases in rotational speed, the planet carrier 214 may begin to rotate in a counter-clockwise direction, causing sonde 230 to also rotate in a counter-clockwise direction.

One embodiment of a closed-loop control mechanism according to the present disclosure may comprise a PID-type (proportional, integral, derivative) control that reads input sensor values from sonde 230 and outputs control signals to turbine 220. An error value may be calculated based on the difference between the rotational speed of sonde 230, as measured by one or more sensors, compared to a target rotational speed. If, for example, the sonde 230 is measured to be rotating faster than desired in a clockwise direction (or not fast enough in a counter-clockwise direction)—for example, because the ring gear 212 has recently increased its clockwise rotational speed—an output signal may be transmitted to increase the speed of turbine 220 so as to increase the rotational speed of sun gear 216 in the counter-clockwise direction. Similarly, if the sonde 230 is measured to be rotating slower than desired in a clockwise direction (or not fast enough in a counter-clockwise direction)—for example, because the ring gear 212 has recently decreased its clockwise rotational speed—an output signal may be transmitted to reduce the speed of turbine 220 so as to decrease the rotational seed of sun gear 216 in the counter-clockwise direction.

In this way, despite changes in rotational speeds of ring gear 212, the rotational speed of the sonde 230 may be independently controlled by varying the rotational speed of turbine 220. In certain embodiments, the turbine 220 may be controlled to maintain the sonde 230 in a stationary, non-rotating position. Further, if a certain orientation is desired, the turbine 220 first may be operated to allow rotation until the sonde 230 is aligned to the desired orientation then operated to maintain that desired orientation.

In alternative embodiments, a planetary gearbox may comprise a multiple-stage gearbox with, for example, two ring gears, two planetary carriers, and/or two sun gears. This configuration may be used to provide more control over gear ratios. In certain of such alternative embodiments, a drive shaft may be coupled to the first sun gear, the first planetary carrier may be coupled to the second sun gear, and the second planetary carrier may be coupled to the output shaft. In this way, the relative rotation speed of the drive shaft compared to the ring gear may still determine the rotation of the output shaft.

Figure 3A:
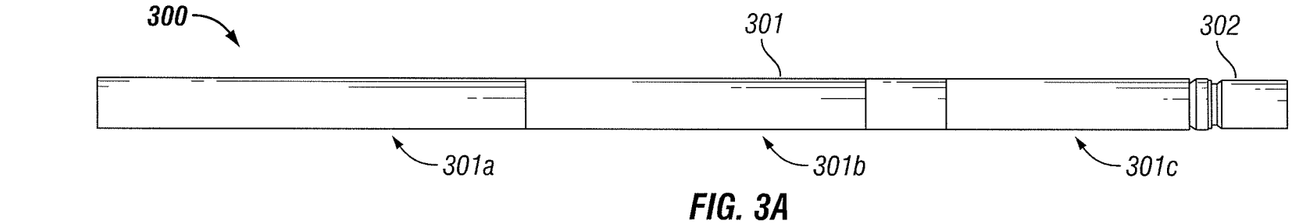
FIGS. 3A-C are diagrams illustrating an example steering assembly, according to aspects of the present disclosure.
Figure 3B:
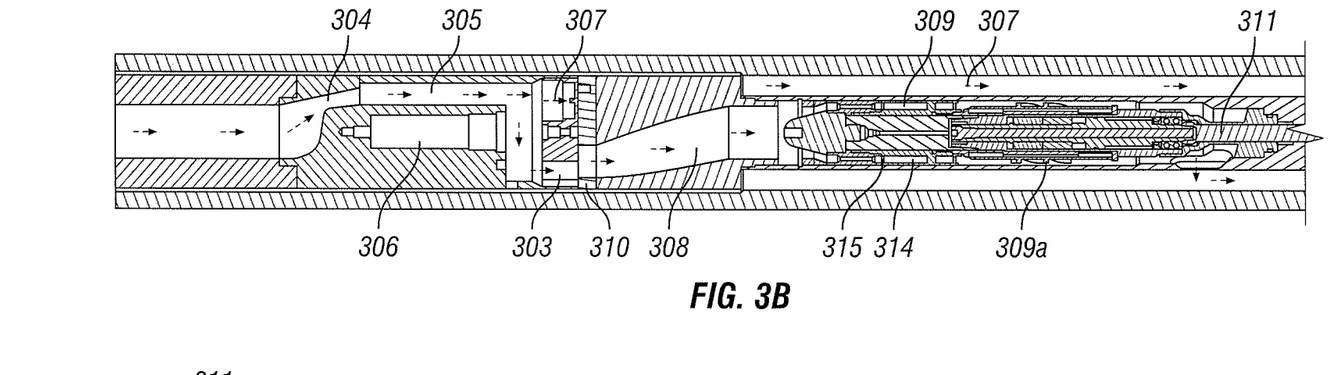
Figure 3C:
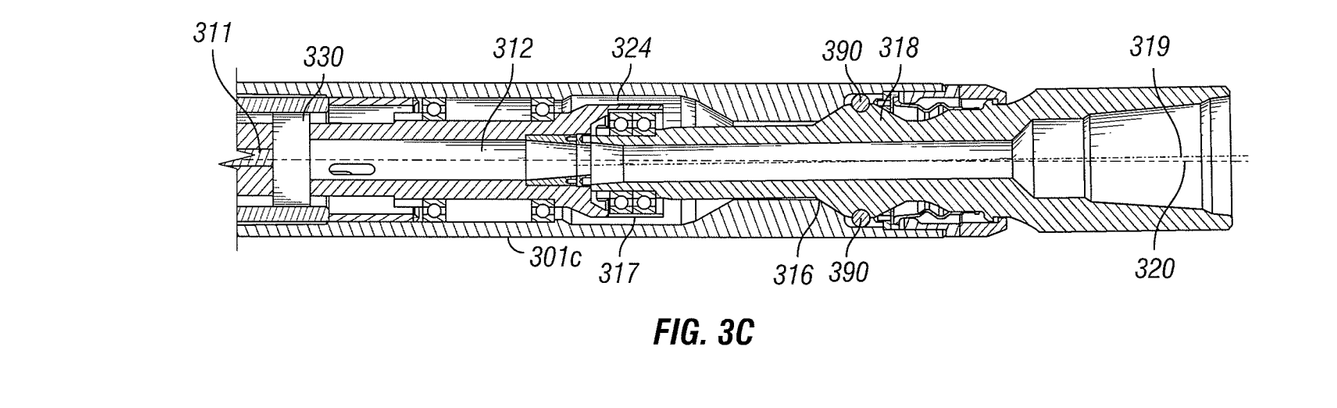

FIGS. 3A-C are diagrams illustrating an example steering assembly 300 that may be controlled, in part, by a speed/position control mechanism, according to aspects of the present disclosure. FIGS. 3B-C depict illustrative portions of the steering assembly 300. As will be described below, the steering assembly 300 may include a housing 301 that may be coupled directly to a drill string or indirectly to a drill string, such as through a MWD apparatus. The housing 301 may include separate segments 301a-c, or may include a single unitary housing. In certain embodiments, as will be described below, each of the segments may correspond to a separate instrument portion of the steering assembly 300. For example, section 301a may house the control mechanisms, and may communicate with the control unit 113 and/or receive control signals from the surface and control mechanisms within the steering assembly 300. In certain embodiments, the control mechanisms may include an information handling system and computer-readable media and may receive measurements from position sensors within the steering assembly 300, such as gravity toolface sensors that may indicate a drilling direction. Section 301b may include drive elements, including a variable flow pathway and a flow-controlled drive mechanism. Section 301c may include steering elements that control the drilling angle and axial orientation of a drill bit coupled to bit shaft 302 of the steering assembly 300.

In certain embodiments, the steering assembly 300 may be coupled, directly or indirectly, to a drill string, through which drilling fluid may be pumped during drilling operations. The drilling fluid may flow through one or more ports 304 into an annulus 305 around a flow control module 306. Once in the annulus 305, the drilling fluid may either flow to an inner annulus 308, in fluid communication with a fluid-controlled drive mechanism 309, or may be diverted to a bypass annulus 307.

As described above, the steering assembly 300 may include a fluid-controlled drive mechanism 309 in fluid communication with the variable flow fluid pathway 303 via the inner annulus 308. In the embodiment shown, the fluid-controlled drive mechanism 309 comprises a turbine, but other fluid-controlled drive mechanisms are possible, including, but not limited to, a mud motor. The fluid-controlled drive mechanism 309 may include a plurality of rotors 309a and stators 314a that generate rotational movement in response to fluid flow within the inner annulus 308. The fluid-controlled drive mechanism 309 may generate rotation at an drive shaft 311, which may be coupled to an offset mandrel 312 via a planetary gearbox 330. As discussed below, the planetary gearbox 330 may allow the drive shaft 311 to impart rotation from the fluid-controlled drive mechanism 309 to the offset mandrel 312, such that the offset mandrel 312 may be rotated independently from the housing 301. The offset mandrel 312 may be coupled to the planetary gearbox 330 at a first end and may include an eccentric receptacle 317 at a second end. The bit shaft 316 may be at least partially disposed within the eccentric receptacle 317. The eccentric receptacle 317 may be used to alter or maintain a longitudinal axis 319 of the bit shaft 316 and a drill bit (not shown) coupled to the bit shaft 316.

The bit shaft 316 may be pivotally coupled to the housing 301 at pivot point 318. As can be seen, the bit shaft 316 may pivot about the pivot point 318 to alter a longitudinal axis 319 of the bit shaft 316. In certain embodiments, the eccentric receptacle 317 may cause the bit shaft 316 to pivot about pivot point 318, which may offset the longitudinal axis 319 of the bit shaft 316 relative to the longitudinal axis 320 of the steering assembly 300. In addition to allowing the bit shaft 316 to pivot relative to the housing 301, the pivot point 318 may also be used to impart torque from the housing 301 to the bit shaft 316. The torque may be imparted to a drill bit (not shown) that is coupled to the bit shaft 316 and that may share the longitudinal axis 319 of the bit shaft 216. The longitudinal axis 319 of the bit shaft 316 may therefore correspond to a drilling angle of the steering assembly 300.

During drilling operations, a drill string coupled to the housing 301 may be rotated, causing the housing 301 to rotate around the longitudinal axis 320. The rotation of the housing 301 may be imparted to the bit shaft 316 as torque through pivot point 318 using balls 390. The torque may cause the bit shaft 316 to rotate about its longitudinal axis 319 as well as the longitudinal axis 320 of the steering assembly 300. When the longitudinal axis 319 of the bit shaft 316 is offset relative to the longitudinal axis 320 of the steering assembly 300, this may cause the end of the bit shaft 316 to rotate with respect to the longitudinal axis 320, changing the angular direction of the bit shaft 316 and corresponding bit with respect to the surrounding formation.

In certain embodiments, it may be desirable to control the speed of the fluid-controlled drive mechanism 309 due to a change in input or a change in target output. For example, the fluid flow coming through the port 304 may be fluctuating, and it may be desirable to keep the speed of the fluid-controlled drive mechanism 309 constant. Alternatively, it may be desirable to increase the speed of the fluid-controlled drive mechanism by allowing more fluid to enter through port 304. Therefore, a flow control valve 310 may be included within the flow control module 306. The flow control valve 310 may control the amount/flow of drilling fluid that enters the inner annulus 308 to drive the fluid-controlled drive mechanism 309. In certain embodiments, the fluid pathway from port 304 to inner annulus 308 may include a variable flow fluid pathway 303, with the fluid-controlled drive mechanism 309 being in fluid communication with the variable flow fluid pathway 303 via inner annulus 308. The flow control valve 310 may be disposed within the variable flow fluid pathway 303, and configured to vary or change the fluid flow through the variable flow fluid pathway 303. According to aspects of the present disclosure, the rotational speed of the fluid-controlled drive mechanism 309 may be controlled by the mass flow rate of drilling fluid that flows into the inner annulus 308. The remaining fluid may be diverted to bypass annulus 307, where it may flow over fluid-controlled drive mechanism 309. In certain embodiments, the flow control valve 310, therefore, may be used to control the rotational speed of the fluid-controlled drive mechanism 309 by varying the mass flow rate of drilling fluid that flows into the inner annulus 308. Fluid control valve 310 may comprise, for example, control circuitry connected to a motor that operates to open and close a shear valve; the control circuitry may be located downhole, for example proximate to fluid control valve 310, or may be located at the surface, for example in control unit 113. As would be appreciated by one of ordinary skill in the art in view of this disclosure, however, other variable flow fluid pathways are possible, using a variety of valve configurations that may meter the flow of drilling fluid across a fluid-controlled drive mechanism. For example, the flow control valve 310 may include a poppet valve, ball valve, globe valve, or any other type of mechanical means that may control the flow of drilling fluid.

In certain embodiments, electromagnetic elements may be used to control the speed of the fluid-controlled drive mechanism 309. Electromagnetic elements may be used either alone or in combination with the flow control valve 310 such that more than one mechanism may control the speed of the fluid-controlled drive mechanism 309. This may be advantageous because while the flow control valve 310 may be able to control speed over a broad range, its effects may be slow to implement. On the other hand, use of electromagnetic elements may be used to make more fine speed adjustments to the fluid-controlled drive mechanism 309 but the effects of the fluid may be implemented quickly. Use of mechanical elements such as the flow control valve 310 in combination with electromagnetic elements may allow an operator to make broad or fine speed adjustments to a fluid-controlled drive mechanism 309 quickly. Electromagnetic elements may include, but are not intended to be limited to, electrorheological (ER) and/or magnetorheological (MR) fluid, or electromagnets.

In some embodiments, a generator (not shown) may be coupled to the fluid-controlled drive mechanism 309. In certain situations, the generator may be producing changing electrical loads and/or the fluid in the inner annulus 308 may be traveling at a variable rate. When higher electrical loads are present on the generator, the speed of the fluid-controlled drive mechanism 309 may slow down. Further, if the speed of the generator drops too low, it may not produce the required voltage since the voltage output of the generator is proportional to the speed of the generator. Thus, one way to control the speed of the fluid-controlled drive mechanism 309 is to control the electrical load on the generator. In the embodiment shown in FIGS. 3B-3C, the generator may be coupled to a rotor 309a of the fluid-controlled drive mechanism 309. The fluid-controlled drive mechanism 309 may additionally include a stator 314. The stator 314a may be magnetically coupled to the rotor 309a via an electromagnet 315 coupled to the rotor 309a. As the fluid-controlled drive mechanism 309 rotates, so does the rotor 309a, which may cause the electromagnet 315 to rotate around the stator 314. This may generate an electrical current within the generator, which may be used to power a variety of control mechanisms and sensors located within the steering assembly 300, including control mechanisms within segment 301a. By controlling the resistance in the electrical circuit attached to the generator, the current through the generator and hence by extension, the torque on the fluid-controlled drive mechanism 309 may be controlled. This may result in speed control of the fluid-controlled drive mechanism 309. In other embodiments, electromagnetic elements may include MR or ER fluids, for example, but are not intended to be limited to such.

Figure 4A:
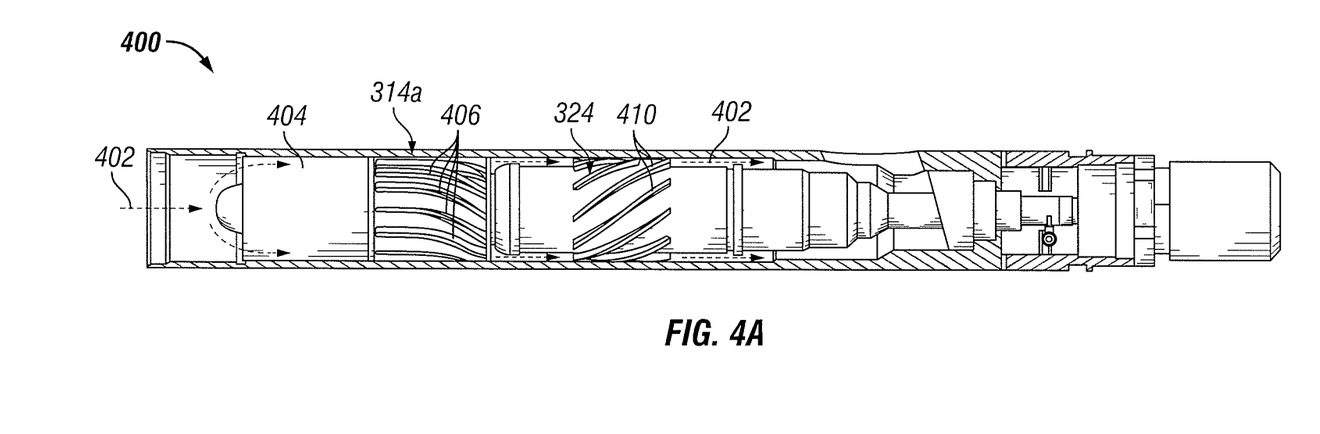
FIGS. 4A-B depict the outer surfaces and cross-sectional views of an example steering assembly, according to aspects of the present disclosure.
Figure 4B:
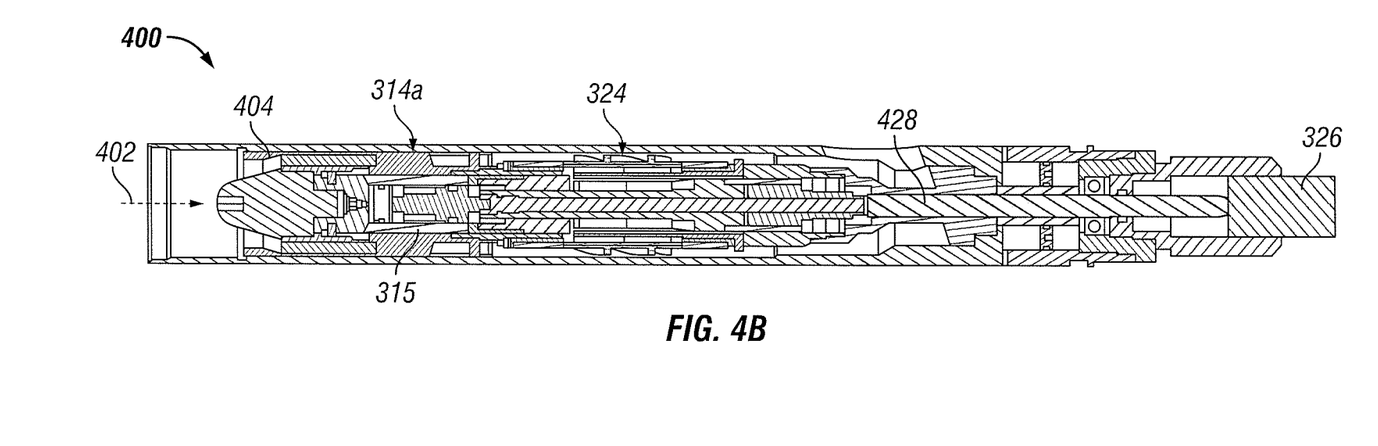

FIG. 4A depicts a view of the outer surfaces of a steering assembly 400 while FIG. 4B shows a cross-sectional view. The steering assembly 400 may include a flow way 402 to accommodate the flow of drilling fluid. The steering assembly 400 may include a sonde pressure housing 404 disposed in the flow way 402. The sonde pressure housing 404 may include the stator 314 having multiple stator blades 406 extending from the stator 314 into the flow way 402. The sonde pressure housing 404 may also include an impeller 324 having multiple impeller blades 410 extending from the impeller 324 into the flow way 402 to convert energy of the fluid flow as it exits the stator 314 into rotational energy. The stator 314 may be operable to accelerate and turn the fluid flow to a more suitable velocity and angle of incidence as the fluid flow exits the stator 314 and enters the impeller 324. One or more electromagnets 315 may be attached to the stator 314.

The impeller 324 may be coupled to a load-generating assembly 326 via a shaft 428. The load-generating assembly 326 may include a power-generating source, such as an electrical or hydraulic power source, a steering control mechanism, or a friction-inducing brake, but is not intended to be limited to such. The speed of the impeller 324 may be a function of the geometry of the impeller 324 and the stator 314a, the fluid flow rate, and the total load generated by the load-generating assembly 326. Fluid may enter the stator 314a and the impeller 324, causing the impeller to rotate due to energy transferred from the fluid flow. In order to control the speed of the impeller 324, a control load may be added to the system 400 by the load-generating assembly 326. The control load may be varied in order to adjust the speed of the impeller 324.

Figure 5:
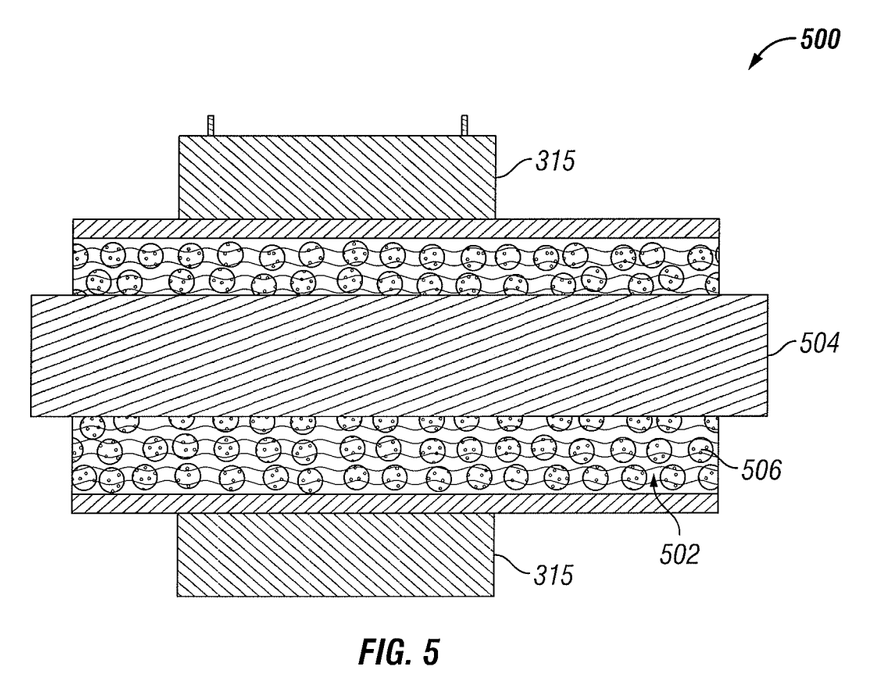
FIG. 5 depicts a cross-sectional view of a fluid chamber according to aspects of the present disclosure.

FIG. 5 depicts a fluid chamber denoted generally with numeral 500 that may be used to control the speed of the fluid-controlled drive mechanism using one or more electromagnetic elements. In some embodiments, the load-generating assembly 326 shown in FIG. 4B may include the fluid chamber 500. In other words, the fluid chamber 500 may be used as the control load. In other embodiments, the fluid chamber 500 may be included in the steering assembly 400 in the area denoted "B" on FIG. 4B. In other embodiments, the rotating shaft 504 of the fluid chamber 500 may be coupled to the rotor 309a shown in FIG. 3B. The fluid chamber 500 may include a rotating shaft 504 disposed within a cavity 502. The cavity 502 may contain MR or ER fluid 506, and therefore, the rotating shaft 504 may be immersed in MR or ER fluid 506. The torque required to rotate the rotating shaft 504 may be adjusted by applying a magnetic or electric field to the MR or ER fluid 506. For example, an electromagnet 315 may be coupled to the cavity 502, which contains the MR or ER fluid. When current is produced through the electromagnet 315, the viscosity of the fluid and therefore the load on the rotating shaft 504 may change. The higher the magnetic or electric field strength, the more torque will be required to rotate the rotating shaft 504. In other words, magnetic/electric field strength and required torque may be inversely proportional.

In certain embodiments, the drive mechanism 309 and planetary gearbox 330 may be used to control the angular orientation and/or rotational speed of the bit shaft 316, as described above with respect to FIG. 2. For example, the ring gear of planetary gearbox 330 may be embedded within housing 301, coupled to housing 301, or coupled to the drill string. Rotation of the drill string, for example during drilling operations, may thereby induce rotation of the ring gear of planetary gearbox 330. Similarly, drive shaft 311 of fluid-controlled drive mechanism 309 may be coupled to the sun gear of planetary gearbox 330. In this way, the rotation of the sun gear may be increased or decreased by controlling the flow control valve 310 to regulate the flow of drilling fluid across the fluid-controlled drive mechanism 309 and the resulting rotation of drive shaft 311. In certain embodiments, the rotation of the sun gear may also be increased or decreased by the control of electromagnetic elements, as discussed above with respect to the embodiment of FIG. 5. Offset mandrel 312 may be coupled to the planet carrier of planetary gearbox 330, such that the position and rotation of the planet carrier may control the angular orientation and rotational speed of offset mandrel 312 and, therefore, bit shaft 316. As discussed with respect to the embodiment of FIG. 2, the rotation of the planet carrier of planetary gearbox 330 may be determined by the relative rotation speeds of the ring gear and the sun gear of planetary gearbox 330.

Thus, a drill string may be rotated in a first direction at a first speed, causing the housing 301 and the ring gear of planetary gearbox 330 to rotate in the first direction at the first speed. To control the angular orientation of the bit shaft 316 with respect to the surrounding formation, the flow control valve 310 may be operated to allow a flow of drilling fluid across the fluid-controlled drive mechanism 309 such that the drive shaft 311 is rotated in a second direction. The rotation of drive shaft 311 may cause the sun gear of planetary gearbox 330 to rotate opposite the first direction at a second speed dependent on the amount of fluid flow allowed by flow control valve 310. Within the planetary gearbox 330, the relative difference between the first speed of the ring gear and the second speed of the sun gear may determine the rotation of the planet carrier and thus the rotation of offset mandrel 312. If the rotation of the sun gear offsets the rotation of the ring gear, the planet carrier (and thus the eccentric end 317 of the offset mandrel 312) may remain stationary with respect to the surrounding formation (geo-stationary), maintaining the angular orientation of the bit shaft 316 relative to the formation while still allowing the bit shaft 316 to rotate about its longitudinal axis 319. Likewise, the angular orientation of the bit shaft 316 may be altered relative to the surrounding formation by operating the flow control valve 310 to increase or decrease the rotation speed of the fluid-controlled drive mechanism 309.

In certain embodiments, the offset mandrel 312, bit shaft 316, or drill bit may include or may be proximate to sensors (not shown), such as RPM sensors, positional sensors, accelerometers, magnetometers, or other sensors known to those of skill in the art. The sensors may be operable to continuously monitor the speed, position, orientation, or other characteristics of the offset mandrel 312, bit shaft 316, or drill bit. The desired rotational speed, position, magnetic alignment, or other setpoint may be continuously compared with the values measured by the sensors. The sensors may be coupled to electronics (not shown) located either downhole, at the surface, or at a remote location. The electronics associated with the sensors may issue error signals, which may be processed to relate the measured value to a change in the position of the flow control valve 310 in order to achieve the setpoint. The flow control valve 310 may then change position, thus altering the flow of the fluid passing through to the fluid-controlled drive mechanism 309, resulting in a change in the speed of the fluid-controlled drive mechanism 309 and, via planetary gearbox 330, a change in the rotational speed of offset mandrel 312. This process may repeat until the setpoint has been achieved (or until the system is within an allowable error band).

Figure 6:
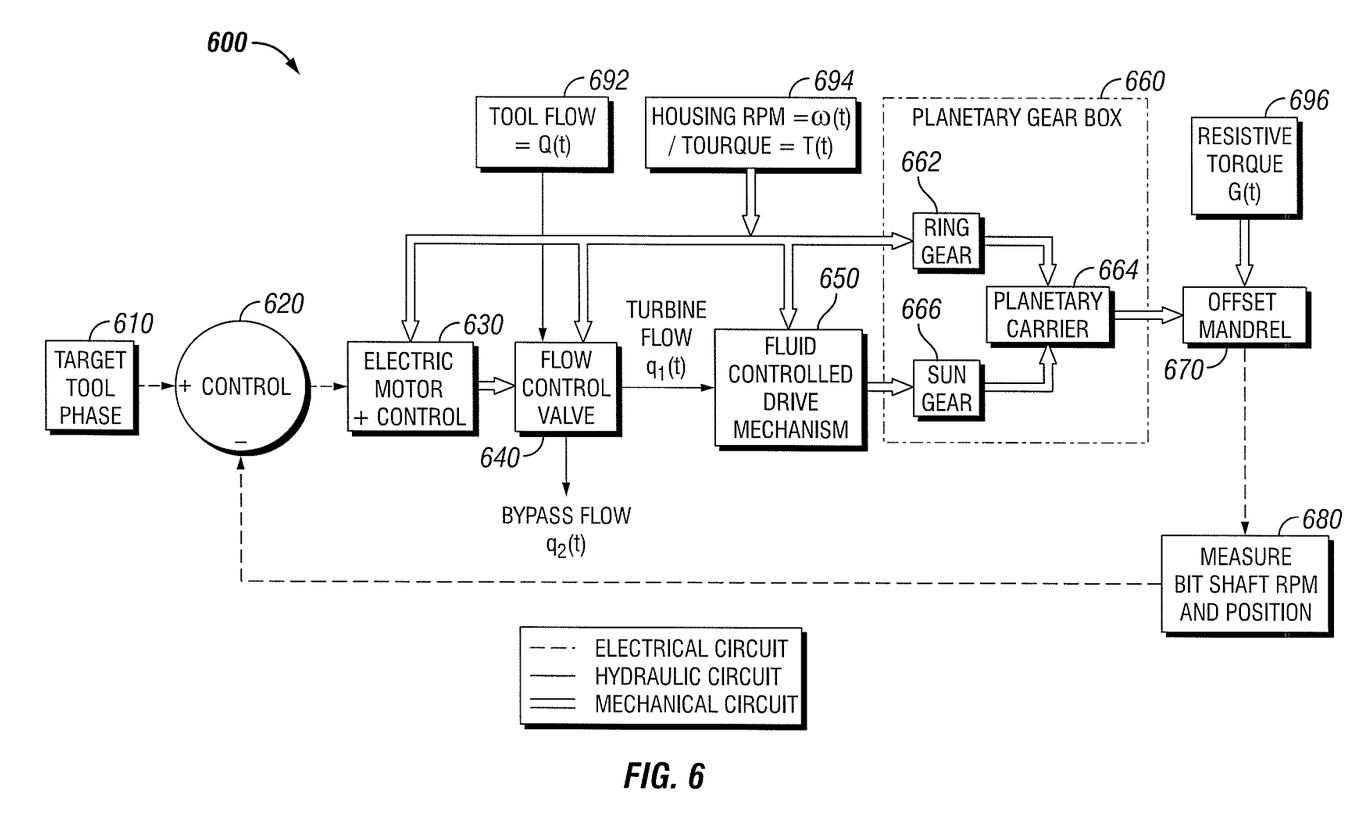
FIG. 6 is a block diagram illustrating a closed-loop control scheme, according to aspects of the present disclosure.

FIG. 6 is a block diagram illustrating a closed-loop control scheme 600, according to aspects of the present disclosure. At 610, a target tool phase setpoint may be input to controller 620 via an electrical circuit. The setpoint may specify a target rotation speed, position, magnetic alignment, or other measurable characteristic. At 620, a controller may receive sensor measurement values 680 via an electrical circuit and calculate an error between the setpoint and the measured value. Based on the calculated error, controller 620 may output a signal to electric motor and control 630. Controller 620 may be, for example, a PID-type controller that may determine an output signal based on a combination of proportional, integral, and derivative calculations of error.

At 630, an electric motor and control may receive the output signal from controller 620. The electric motor may be mechanically coupled to a flow control valve, such as flow control valve 310. Based on the signal received from controller 620, the electric motor and control at 630 may operate to open or close the flow control valve. Additionally, in embodiments where electromagnetic elements may be used to control the speed of a fluid-controlled drive mechanism, the electric motor and control may operate those electromagnetic elements in combination with the flow control valve.

At 640, the flow control valve may experience a total tool flow of fluid over time 692, represented as the function Q(t). Some portion of the total tool flow of fluid over time Q(t) may be may be diverted to a bypass annulus, such as bypass annulus 307, and may be represented as bypass flow over time $q_2(t)$. The remaining fluid may be directed to the turbine of a fluid-controlled drive mechanism, such as fluid-controlled drive mechanism 309, and may be represented as turbine flow $q_1(t)$. Thus, in a closed system, Q(t) will equal the sum of $q_1(t)$ and $q_2(t)$. The relative magnitudes of $q_1(t)$ and $q_2(t)$ may vary based on the opening and closing of the fluid control valve by the motor and control at 630.

At 650, the fluid-controlled drive mechanism may generate a rotational force, for example on an drive shaft 311, that is mechanically coupled to a sun gear 666 of a planetary gearbox 660. The magnitude of the rotational force may vary based on the magnitude of the turbine flow $q_1(t)$.

During drilling operations, a drill string may be rotated, inducing rotation in a housing, such as housing 301. This rotational force 694 may be represented as housing RPMs over time $\omega(t)$ and as housing torque T(t) and may be mechanically transmitted to any components mechanically coupled to said housing. In the embodiment of FIG. 6, the rotational force 694 is shown as being exerted on the motor 630, flow control valve 640, fluid-controlled drive mechanism 650, and ring gear 662 of planetary gearbox 660. As discussed with respect to the embodiment of FIG. 2, planet carrier 664 is mechanically coupled to ring gear 662 and sun gear 666 and will have a rotational speed determined by their relative rotational speeds of ring gear 662 and sun gear 666.

At 670, the rotational speed of planet carrier 664 is mechanically transmitted to an offset mandrel, such as offset mandrel 312. The offset mandrel 670 may be coupled, for example, to a drill shaft and/or drill bit. During drilling operations, the drill bit may encounter rotational resistance, shown in FIG. 6 as resistive torque 696 and represented over time as G(t).

At 680, the net of inputs over time of turbine flow $q_1(t)$, housing RPMs $\omega(t)$, housing torque T(t), resistive torque G(t), and any other relevant inputs may result in sensor measurement values 680 indicating the rotation speed, position, magnetic alignment, or other measurable characteristic of the offset mandrel, drill shaft, and/or drill bit. Those measurement values may be electrically communicated to controller 620, which may in turn calculate an updated error value and adjust the electrical output signal to electric motor and control 630. In this way, the desired setpoint may be achieved automatically through a closed-loop control mechanism. As one of skill in the art will appreciate in light of the present disclosure, the mechanism may also be robust against disruptions, such as variations in the drill string RPM, changes in resistive torque on the offset mandrel due to varying load on the bearings during drilling, variations in tool flow due to pressure changes or pulsar operations, etc.

In alternative embodiments, controller 620 may be configured to determine its output signal based at least in part on anticipated future error using, for example, sensor measurements of inputs such as tool flow Q(t), housing RPMs $\omega(t)$, housing torque T(t), and resistive torque G(t). Thus, for example, if a sensor measures a disruption in tool flow Q(t), the controller 620 may appropriately adjust its output signal to offset the observed disruption. In this way, controller 620 may also anticipate errors and issue proactive control signals to prevent them.

An embodiment is a system comprising a planetary gearbox disposed within a housing, wherein the planetary gearbox comprises a ring gear coupled to the housing, a sun gear coupled to a drive shaft, and a planetary carrier coupled to an output shaft. A sensor may be proximate to the output shaft and a controller may be coupled to the sensor, such that the controller receives a measurement taken by the sensor and outputs a control signal that causes a change in rotational speed of the drive shaft.

In certain embodiments the control signal may be determined based on a comparison of the measurement to a target measurement. The target measurement may optionally be, for example, a target rotational speed or a target position. The controller may optionally be a PID control, and in certain embodiments the output shaft may be a sonde.

An embodiment is a method for closed-loop control comprising rotating a housing coupled to a ring gear of a planetary gearbox, wherein an output shaft may be coupled to a planetary carrier of the planetary gearbox; taking a measurement; receiving the measurement at a controller; and outputting a control signal from the controller to cause a change in rotational speed of a drive shaft coupled to a sun gear of said planetary gearbox.

In certain embodiments, the method may further comprise setting a target measurement and calculating an error based on a comparison of the measurement to the target measurement, wherein the control signal may be based on the error. The target measurement may be a target rotational speed or a target position.

The method optionally may also comprise calculating an anticipated change in rotational speed of the output shaft using the measurement, such that the control signal may be based on the anticipated change in rotational speed of the output shaft. The controller may be a PID control.

An embodiment is a system comprising a planetary gearbox disposed within a housing, wherein the planetary gearbox comprises a ring gear, a sun gear, and a planetary carrier. The ring gear may be coupled to the housing; the sun gear may be coupled to a drive shaft; and the planetary carrier may be coupled to an offset mandrel. A drill bit shaft may be coupled to the offset mandrel such that rotating the offset mandrel changes a longitudinal axis of the drill bit shaft and rotating the housing causes the drill bit shaft to rotate about the longitudinal axis. A sensor may be proximate to the drill bit shaft, and a controller may be communicatively coupled to the sensor, where the controller receives a measurement taken by the sensor and outputs a control signal that causes a change in rotational speed of the drive shaft.

In certain embodiments, the system may further comprise a flow control valve that controls a fluid flow through a variable flow fluid pathway disposed within the housing, and an impeller in fluid communication with the variable flow fluid pathway such that the impeller causes a rotation of the drive shaft. The control signal may optionally cause the fluid control valve to change the amount of the fluid flow through the variable flow fluid pathway. The fluid flow may comprise a flow of drilling fluid, and the fluid control valve may be a shear valve. The system may optionally further comprise an electromagnet coupled to the housing, such that the viscosity of the fluid flow may be changed by the electromagnet.

In certain embodiments, the control signal may be determined based on a comparison of the measurement to a target measurement, and the target measurement may be, for example, a target drill bit shaft orientation.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces. Additionally, the terms "couple" or "coupled" or any common variation as used in the detailed description or claims are not intended to be limited to a direct coupling. Rather, two elements may be coupled indirectly and still be considered coupled within the scope of the detailed description and claims.

What is claimed is:

1. A steering assembly comprising:
a fluid-controlled drive mechanism in fluid communication with a variable flow fluid pathway via an inner annulus, wherein the fluid-controlled drive mechanism generates rotation at a drive shaft, wherein the fluid-controlled drive mechanism is controlled by flow rate of a fluid into the inner annulus;
a planetary gearbox disposed within a housing of the steering assembly, wherein the drive shaft is coupled to an offset mandrel via the planetary gearbox, wherein the planetary gearbox allows the drive shaft to impart rotation from the fluid-controlled drive mechanism to the offset mandrel such that the offset mandrel is independently rotatable from the housing, wherein the housing is coupled to a drill string, wherein the rotation of the drill string in a first direction at a first speed induces rotation of the housing in the first direction at the first speed around a longitudinal axis of the steering assembly, and wherein the planetary gearbox comprises:
  a ring gear coupled to the housing, wherein rotation of the housing with the drill string in the first direction at the first speed induces rotation of the ring gear in the first direction at the first speed;
  a sun gear coupled to the drive shaft, wherein drive shaft drives rotation of the sun gear in a second direction at a second speed; and
  a planetary carrier coupled to the offset mandrel at one end of the offset mandrel such that the offset mandrel rotates with the planetary carrier in a same direction and a same speed as the planetary carrier, wherein:
    the offset mandrel is coupled to an output shaft at the other end of the offset mandrel,
    rotation of the planetary carrier around the sun gear causes the offset mandrel and the output shaft to rotate in the same direction and the same speed as the planetary carrier,
    rotation of the planetary carrier causes the offset mandrel to change a deviation of a longitudinal axis of the output shaft from the longitudinal axis of the steering assembly and change the angular orientation of the output shaft relative to a formation;
    a relative difference between the first speed of the ring gear and the second speed of the sun gear determines the rotation of the planetary carrier, the offset mandrel and the output shaft, wherein rotation of the sun gear offsets the rotation of the ring gear to maintain a geostationary position of the planetary carrier with respect to the formation and maintain the angular orientation of the output shaft relative to the formation while allowing the output shaft to rotate about the longitudinal axis of the output shaft;
a sensor of the steering assembly;
a controller communicatively coupled to the sensor, wherein the controller receives a measurement taken by the sensor and outputs a control signal that causes a change in rotational speed of the drive shaft; and
a bypass annulus, wherein a portion of a fluid directed to the drive shaft is diverted through the bypass annulus.

2. The steering assembly of claim 1, wherein the control signal is determined based on a comparison of the measurement to a target measurement.

3. The steering assembly of claim 2, wherein the target measurement is a target rotational speed.

4. The steering assembly of claim 2, wherein the target measurement is a target position.

5. The steering assembly of claim 2, wherein the controller is a PID control.

6. The steering assembly of claim 2, wherein the output shaft is a sonde.

7. A method for closed-loop control of a steering assembly comprising:
inducing, by a fluid-controlled drive mechanism in fluid communication with a variable flow fluid pathway via an inner annulus, rotation at a drive shaft, wherein the fluid-controlled drive mechanism is controlled by flow rate of a fluid into the inner annulus;
inducing, by a drill string, rotation of a housing of the steering assembly around a longitudinal axis of the steering assembly;
inducing, by the drill string rotating in a first direction at a first speed, rotation of a ring gear of a planetary gearbox disposed within the housing of the steering assembly in the first direction and at the first speed, wherein the drive shaft is coupled to an offset mandrel via the planetary gearbox, wherein the planetary gearbox allows the drive shaft to impart rotation from the fluid-controlled drive mechanism to the offset mandrel such that the offset mandrel is independently rotatable from the housing, wherein the ring gear is coupled to the housing, and wherein an output shaft is coupled to a planetary carrier of the planetary gearbox;
inducing, by rotation of the drive shaft, rotation of a sun gear of the planetary gearbox coupled to the drive shaft, wherein the drive shaft drives rotation of the sun gear in a second direction at a second speed;
inducing, by rotation of the planetary carrier around the sun gear, rotation of the output shaft, wherein the rotation of the planetary carrier is controlled by relative rotation speeds of the ring gear and the sun gear, wherein:
  the planetary carrier is coupled to one end of the offset mandrel and the output shaft is coupled to the other end of the offset mandrel such that the offset mandrel and the drive shaft rotate with the planetary carrier in a same direction and a same speed as the planetary carrier,
  rotation of the planetary carrier around the sun gear causes the offset mandrel and the output shaft to rotate in the same direction and the same speed as the planetary carrier,
  a relative difference between the first speed of the ring gear and the second speed of the sun gear determines the rotation of the planetary carrier, the offset mandrel and the output shaft,
  rotation of the planetary carrier causes the offset mandrel to change a deviation of a longitudinal axis of the output shaft from the longitudinal axis of the steering assembly and change the angular orientation of the output shaft relative to a formation;
offsetting, by rotation of the sun gear, the rotation of the ring gear to maintain a geostationary position of the planetary carrier with respect to the formation and maintain the angular orientation of the output shaft relative to the formation while allowing the output shaft to rotate about the longitudinal axis of the output shaft;
taking a measurement from one or more sensors within the steering assembly indicative of at least one of rotational speed and position of the output shaft;
receiving the measurement at a controller;

outputting a control signal from the controller to cause a change in rotational speed of the drive shaft coupled to the sun gear of the planetary gearbox; and diverting a flow of a portion of the fluid directed to the draft shaft through a bypass annulus.

8. The method of claim 7, further comprising:

setting a target measurement; and calculating an error based on a comparison of the measurement to the target measurement, wherein the control signal is based on the error.

9. The method of claim 8, wherein the target measurement is a target rotational speed.

10. The method of claim 8, wherein the target measurement is a target position.

11. The method of claim 8, wherein the controller is a PID control.

12. The method of claim 7, further comprising:

calculating an anticipated change in rotational speed of the output shaft using the measurement, wherein the control signal is based on the anticipated change in rotational speed of the output shaft.

13. A system for controlling steering of a drill bit comprising:

a fluid-controlled drive mechanism in fluid communication with a variable flow fluid pathway via an inner annulus, wherein the fluid-controlled drive mechanism generates rotation at a drive shaft, wherein the fluid-controlled drive mechanism is controlled by flow rate of a fluid into the inner annulus;

a planetary gearbox disposed within a housing of a steering assembly, wherein the drive shaft is coupled to an offset mandrel via the planetary gearbox, wherein the planetary gearbox allows the drive shaft to impart rotation from the fluid-controlled drive mechanism to the offset mandrel such that the offset mandrel is independently rotatable from the housing, wherein the housing is coupled to a drill string, where the rotation of the drill string in a first direction at a first speed induces rotation of the housing in the first direction at the first speed around a longitudinal axis of the steering assembly, and wherein the planetary gearbox comprises a ring gear, a sun gear, and a planetary carrier, and wherein the ring gear is coupled to the housing, wherein rotation of the housing with the drill string in the first direction at the first speed induces rotation of the ring gear in the first direction at the first speed;

the sun gear is coupled to the drive shaft, wherein drive shaft drives rotation of the sun gear in a second direction at a second speed; and the planetary carrier is coupled to the offset mandrel at one end of the offset mandrel such that the offset mandrel rotates with the planetary carrier in a same direction and a same speed as the planetary carrier, wherein rotation of the planetary carrier around the sun gear causes the offset mandrel to rotate in the same direction and the same speed as the planetary carrier, wherein rotation of the planetary carrier is controlled by relative rotation speeds of the ring gear and the sun gear;

a drill bit shaft coupled to the other end of the offset mandrel and a drill bit, wherein:

rotation of the planetary carrier causes the offset mandrel to change a deviation of a longitudinal axis of the drill bit shaft from the longitudinal axis of the steering assembly and change the angular orientation of the drill bit shaft relative to a formation;

a relative difference between the first speed of the ring gear and the second speed of the sun gear determines the rotation of the planetary carrier, the offset mandrel and the drill bit shaft, wherein rotation of the sun gear offsets the rotation of the ring gear to maintain a geostationary position of the planetary carrier with respect to the formation and maintain the angular orientation of the drill bit shaft relative to the formation while allowing the drill bit shaft to rotate about the longitudinal axis of the drill bit shaft;

a sensor of the system, wherein the sensor monitors at least one of speed, position and orientation of the drill bit shaft;

a controller communicatively coupled to the sensor, wherein the controller receives a measurement taken by the sensor and outputs a control signal that causes a change in rotational speed of the drive shaft; and a bypass annulus, wherein a portion of a fluid directed to the drill bit shaft is diverted through the bypass annulus.

14. The system of claim 13, further comprising:

a flow control valve that controls a fluid flow of the fluid through a variable flow fluid pathway disposed within the housing; and an impeller in fluid communication with the variable flow fluid pathway, wherein the impeller causes a rotation of the drive shaft.

15. The system of claim 14, wherein the control signal causes the fluid control valve to change the amount of the fluid flow through the variable flow fluid pathway.

16. The system of claim 15, wherein the fluid flow comprises a flow of drilling fluid.

17. The system of claim 16, wherein the fluid control valve is a shear valve.

18. The system of claim 14, further comprising an electromagnet coupled to the housing, wherein the viscosity of said fluid flow may be changed by the electromagnet.

19. The system of claim 13, wherein the control signal is determined based on a comparison of the measurement to a target measurement.

20. The system of claim 19, wherein the target measurement is a target drill bit shaft orientation.

* * * * *